US010675982B2

(12) United States Patent
Fontana et al.

(10) Patent No.: US 10,675,982 B2
(45) Date of Patent: Jun. 9, 2020

(54) SYSTEM AND METHOD FOR INDUCTIVE CHARGING WITH IMPROVED EFFICIENCY

(71) Applicant: General Electric Company, Schenectady, NY (US)

(72) Inventors: Edward Clark Fontana, Plano, TX (US); Robert James Catalano, Plano, TX (US); James Edward Harvey, Plano, TX (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 15/788,971

(22) Filed: Oct. 20, 2017

(65) Prior Publication Data

US 2018/0272882 A1 Sep. 27, 2018

Related U.S. Application Data

(60) Provisional application No. 62/477,151, filed on Mar. 27, 2017.

(51) Int. Cl.
*H02J 7/02* (2016.01)
*B60L 11/18* (2006.01)
(Continued)

(52) U.S. Cl.
CPC .............. *B60L 11/182* (2013.01); *B60L 53/12* (2019.02); *B60L 53/302* (2019.02); *B60L 53/35* (2019.02);
(Continued)

(58) Field of Classification Search
CPC ........ B60L 11/182; B60L 53/35; B60L 53/60; B60L 53/38; B60L 53/12; B60L 53/302;
(Continued)

(56) References Cited

U.S. PATENT DOCUMENTS 4,031,449 A * 6/1977 Trombly ................. H02J 7/022
320/108
4,654,573 A * 3/1987 Rough .................. B60L 53/305
320/108
(Continued)

FOREIGN PATENT DOCUMENTS

WO 2010060720 A2 6/2010

OTHER PUBLICATIONS

Deng et al.; "Design Methodology of LLC Resonant Converters for Electric Vehicle Battery Chargers"; IEEE Transactions on Vehicular Technology; vol. 63, No. 4; May 2014; pp. 1581-1592.*
(Continued)

*Primary Examiner* — Naum Levin
(74) *Attorney, Agent, or Firm* — Ziolkowski Patent Solutions Group, SC; Jean K. Testa

(57) ABSTRACT

A charging system for charging an electric vehicle comprises an inductor-inductor-capacitor (LLC) battery charger that includes an isolation transformer having a transformer primary and a transformer secondary, the transformer primary included in an inductive charger station of the charging system and the transformer secondary included in an inductive power receiver of the charging system, with the inductive power receiver positioned on the electric vehicle. The LLC battery charger also includes a magnetizing inductor circuit element and a leakage inductor circuit element integrated into the isolation transformer on the transformer primary. The isolation transformer is constructed such that the transformer primary and the transformer secondary are separable from one another, with a selective engaging and disengaging of the transformer primary and the transformer secondary based on movement of the inductive power receiver on the electric vehicle relative to the inductive charger station.

12 Claims, 6 Drawing Sheets

(51) Int. Cl.

| | | |
|---|---|---|
| *G05D 1/02* | (2020.01) | |
| *G06F 21/44* | (2013.01) | |
| *H02M 3/158* | (2006.01) | |
| *H02M 3/335* | (2006.01) | |
| *B60L 53/12* | (2019.01) | |
| *B60L 53/38* | (2019.01) | |
| *B60L 53/60* | (2019.01) | |
| *H02J 50/90* | (2016.01) | |
| *H02J 50/12* | (2016.01) | |
| *B60L 53/302* | (2019.01) | |
| *H02J 50/10* | (2016.01) | |
| *H02J 50/80* | (2016.01) | |
| *B60L 53/35* | (2019.01) | |
| *H02J 7/06* | (2006.01) | |

(52) U.S. Cl.
CPC ............. *B60L 53/38* (2019.02); *B60L 53/60* (2019.02); *G05D 1/0212* (2013.01); *G05D 1/0225* (2013.01); *G05D 1/0231* (2013.01); *G05D 1/0246* (2013.01); *G06F 21/44* (2013.01); *H02J 7/025* (2013.01); *H02J 7/06* (2013.01); *H02J 50/10* (2016.02); *H02J 50/12* (2016.02); *H02J 50/80* (2016.02); *H02J 50/90* (2016.02); *H02M 3/158* (2013.01); *H02M 3/33569* (2013.01); *B60L 2210/10* (2013.01); *G05D 2201/0213* (2013.01)

(58) Field of Classification Search
CPC .. H02J 50/80; H02J 50/10; H02J 50/12; H02J 50/90; H02J 7/06; H02J 7/025; G05D 1/0246; G05D 1/0225; G05D 1/0231; G05D 1/0212; G05D 2201/0213; H02M 3/33569; H02M 3/158
See application file for complete search history.

(56) References Cited

U.S. PATENT DOCUMENTS

| | | | | |
|---|---|---|---|---|
| 5,462,439 | A | | 10/1995 | Keith |
| 5,572,109 | A | | 11/1996 | Keith |
| 7,369,024 | B2 | * | 5/2008 | Yargole ................. H01F 27/085 336/5 |
| 7,834,584 | B2 | * | 11/2010 | Koyanagi ............... B25J 19/005 318/568.12 |
| 8,511,389 | B2 | * | 8/2013 | Fenton ................ E21B 33/0385 166/368 |
| 8,796,990 | B2 | * | 8/2014 | Paparo ..................... H01F 38/14 320/108 |
| 8,823,551 | B1 | | 9/2014 | Hoffman |
| 8,824,179 | B2 | * | 9/2014 | Limpaecher ............ H02M 3/24 363/68 |
| 8,901,883 | B2 | * | 12/2014 | Moon ..................... H02J 7/022 320/109 |
| 9,001,539 | B2 | * | 4/2015 | Oh ...................... H02M 1/4241 363/89 |
| 9,059,636 | B2 | * | 6/2015 | Lehn ..................... H02M 3/335 |
| 9,106,085 | B2 | * | 8/2015 | Yu .......................... H02J 7/025 |
| 9,263,960 | B2 | * | 2/2016 | Jovanovi ................ H02M 1/10 |
| 9,269,489 | B2 | * | 2/2016 | Wu ........................ H01F 38/14 |
| 9,290,966 | B2 | * | 3/2016 | Hanchett, Jr. ......... H04B 5/0031 |
| 9,318,946 | B2 | * | 4/2016 | Feng ....................... H02M 1/36 |
| 9,595,378 | B2 | * | 3/2017 | Jonas |
| 9,786,425 | B2 | * | 10/2017 | Sakaguchi ............... H01F 37/00 |
| 9,935,556 | B1 | * | 4/2018 | Rana .................. H02M 3/33507 |
| 9,960,642 | B2 | * | 5/2018 | Ozana ..................... H02J 5/005 |
| 9,969,282 | B2 | * | 5/2018 | van Boheemen ....... H02J 50/10 |
| 9,988,129 | B2 | * | 6/2018 | Jamieson ................. B63J 99/00 |
| 10,040,360 | B1 | * | 8/2018 | Long ....................... H02J 7/025 |
| 10,050,464 | B2 | * | 8/2018 | Hsieh ...................... H02J 7/025 |
| 10,097,096 | B2 | * | 10/2018 | Shin .................. H02M 3/33584 |
| 10,158,245 | B2 | * | 12/2018 | Yang ..................... H02J 7/0052 |
| 10,217,552 | B2 | * | 2/2019 | Czainski .................. H01F 3/14 |
| 10,274,532 | B1 | | 4/2019 | Smith et al. |
| 10,279,692 | B2 | | 5/2019 | Asaoka et al. |
| 10,336,194 | B2 | | 7/2019 | Ricci |
| 10,336,203 | B2 | | 7/2019 | Kilic et al. |
| 10,369,894 | B2 | | 8/2019 | McCool et al. |
| 2003/0128563 | A1 | * | 7/2003 | Rojas Romero .... H02M 1/4216 363/89 |
| 2011/0199049 | A1 | | 8/2011 | Nagy |
| 2011/0254504 | A1 | | 10/2011 | Haddad et al. |
| 2012/0049788 | A1 | * | 3/2012 | Kim .................... H05K 7/20918 320/107 |
| 2012/0200151 | A1 | | 8/2012 | Obayashi et al. |
| 2013/0037365 | A1 | | 2/2013 | Ichikawa |
| 2013/0038272 | A1 | | 2/2013 | Sagata |
| 2013/0181669 | A1 | | 7/2013 | Kawasaki |
| 2014/0049990 | A1 | * | 2/2014 | Limpaecher ............ H02M 3/24 363/15 |
| 2014/0092236 | A1 | | 4/2014 | Findeisen et al. |
| 2014/0174870 | A1 | | 6/2014 | Niizuma |
| 2014/0185327 | A1 | * | 7/2014 | Shah .................... H02M 1/4225 363/16 |
| 2014/0191586 | A1 | | 7/2014 | Ichikawa |
| 2014/0232200 | A1 | | 8/2014 | Maekawa |
| 2014/0313790 | A1 | * | 10/2014 | Feng ....................... H02M 1/36 363/21.02 |
| 2014/0371966 | A1 | | 12/2014 | Ohashi et al. |
| 2015/0061576 | A1 | | 3/2015 | Chen |
| 2015/0073642 | A1 | | 3/2015 | Widmer et al. |
| 2016/0064964 | A1 | * | 3/2016 | Knoedgen ............. H02J 7/0018 320/116 |
| 2016/0251081 | A1 | | 9/2016 | Staskevich et al. |
| 2017/0008405 | A1 | * | 1/2017 | Bojarski ................. H02M 7/48 |
| 2017/0077737 | A1 | * | 3/2017 | Hsieh ...................... H02J 7/025 |
| 2017/0170735 | A1 | * | 6/2017 | Yang ....................... H02M 1/14 |
| 2018/0105053 | A1 | | 4/2018 | Ahmed et al. |
| 2018/0141457 | A1 | * | 5/2018 | Lee ................... H02M 3/33523 |
| 2018/0141657 | A1 | | 5/2018 | Han et al. |
| 2018/0201148 | A1 | | 7/2018 | Donnelly et al. |
| 2018/0272875 | A1 | * | 9/2018 | Fontana ............ H02M 3/33569 |

OTHER PUBLICATIONS

English Translation of WO2010060720.
"More Efficient Inductive Electric Vehicle Charger: Using Autonomy to Improve Energy Efficiency," Mar. 28, 2017, pp. 2-8.
Deng et al., "Design Methodology of LLC Resonant Converters for Electric Vehicle Battery Chargers," IEEE Transactions on Vehicular Technology, vol. 63, No. 4, Oct. 25, 2013, pp. 1581-1592.
"An introduction to LLC resonant half-bridge converter," AN2644, STMicroelectronics, Sep. 2008, pp. 1-64.
"Wireless Power Transfer for Light-Duty Plug-In/Electric Vehicles and Alignment Methodology," SAE International, Surface Vehicle Information Report, J2954 TM, May 2016, pp. 1-115.
De Simone et al., "Design guideline for magnetic integration in LLC resonant converters," STMicroelectronics, Jul. 2008, pp. 1-9.

* cited by examiner

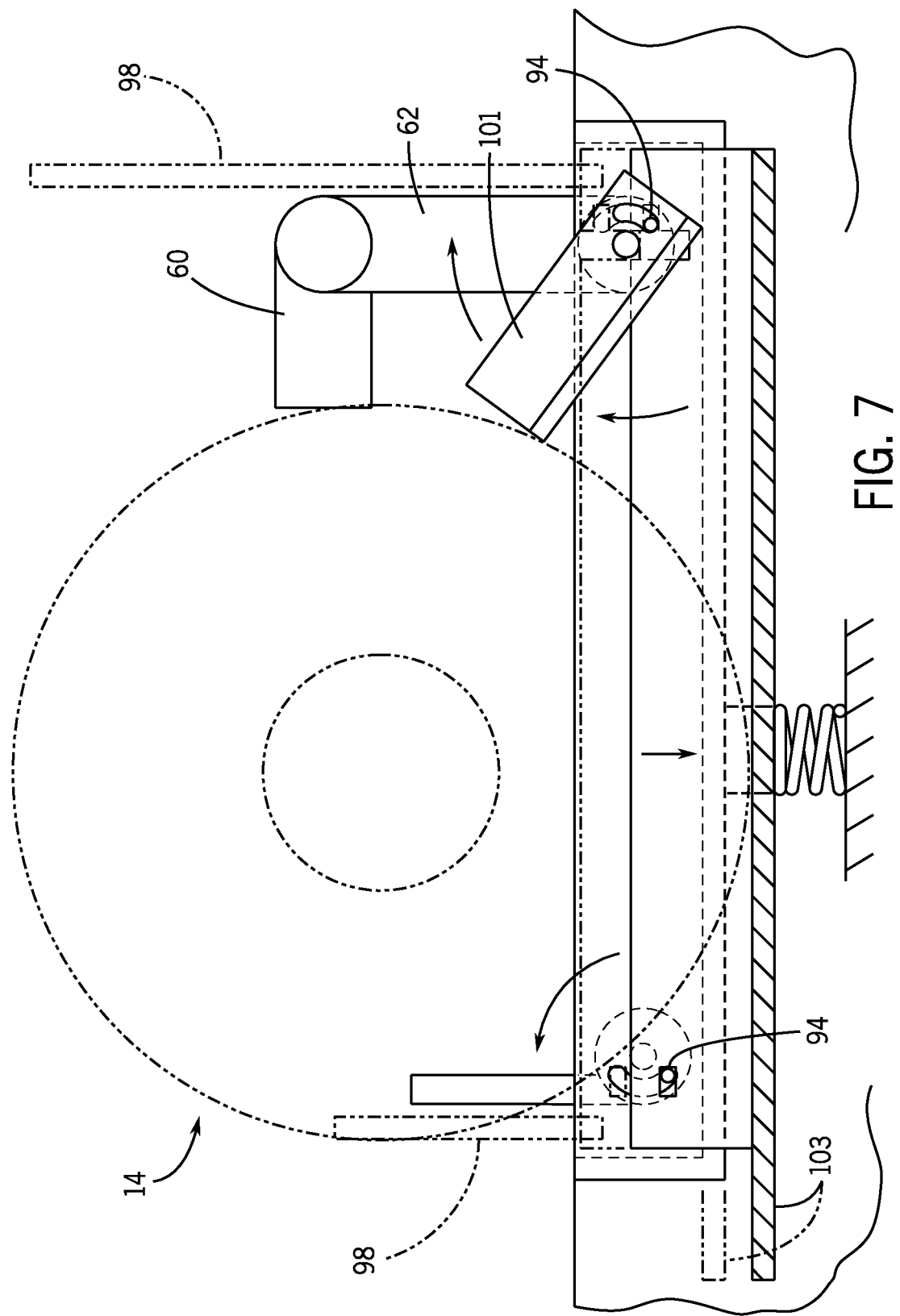

SYSTEM AND METHOD FOR INDUCTIVE CHARGING WITH IMPROVED EFFICIENCY

CROSS REFERENCE TO RELATED APPLICATION

The present invention is a non-provisional of, and claims priority to, U.S. Provisional Patent Application Ser. No. 62/477,151 filed Mar. 27, 2017, the disclosure of which is incorporated herein by reference in its entirety.

BACKGROUND OF THE INVENTION

Embodiments of the invention relate generally to electric vehicle charging and, more particularly, to a system and method for inductive charging of an electric vehicle that provides high efficiency inductive charging. The inductive charging of the vehicle is achieved via a system that is minimally intrusive—both aesthetically and from an infrastructure perspective—to a surrounding environment, and is provided via an autonomous interaction between the electric vehicle and a charging station that provides self-alignment and mating between the electric vehicle and the charging station.

Electric vehicles (EVs) provide a zero-emissions solution for transportation in cities and, in the future, are expected to gradually replace the internal combustion engine vehicle as the primary mode of transportation. Electric vehicles are configured to use electrical energy from an external source to recharge the traction battery thereof, and thus include circuitry and connections to facilitate the recharging of the traction battery from the utility grid or another external source, for example. Typically, these circuitry and connections include a plug-in by which the electric vehicle is connected to the utility grid to receive such charging power.

Unfortunately, it is recognized that a large percentage of electric vehicle owners do not have the ability to charge at home, due to lack of an electrical outlet or space for a charger—with electric vehicle owners who live in an apartment or condominium complex being primary examples. That is, traditional corded plug-in or "hot contact" chargers may often not be available at parking lots and parking garages of an apartment or condominium complex due to concerns of the apartment/condominium owner regarding aesthetic issues (e.g., presenting a "gas station"-like appearance due to multiple charging pedestals), safety/security issues (e.g., exposed cords being vandalized or stolen for the scrap value of copper inside the cords), and/or longevity and upkeep issues (e.g., degradation of electrical contacts due to exposure to the environment, resulting in maintenance/replacement costs and a potential spark hazard to adjacent gasoline fueled vehicles). Further, corded chargers must be handled by a person at the beginning and end of each day (unplugged and plugged) to keep the battery at a good state of charge on the electric vehicle, which may be time consuming, inconvenient, and potentially forgotten by a user, thereby resulting in a car that is out of charge in the morning.

As an alternative to corded plug-in chargers, inductive charging has been used to recharge electric vehicles. Early inductive charging systems for electric vehicles used inductive paddles to solve potential safety and degradation issues typically associated with plug-in chargers. However, these inductive paddles did not address cord issues or charging convenience issues and also resulted in lower charging efficiency as compared to plug-in chargers (e.g., about 85%). More recently, modern inductive electric vehicle chargers have been designed that provide low-clutter, ground-mount charging that is an aesthetic improvement over corded charging stations and impervious to chemicals and electrically safe, as there are no exposed galvanic connections to create a shock or spark hazard. The modern inductive charging systems are also hands-free, but the spacing of the inductive transfer coils, to accommodate suspension travel and misalignment on other axes, results in reduced electrical transfer efficiencies (i.e., charging efficiencies) wherein twice as much energy is lost during the transfer as compared to the best hot contact chargers. Thus, state-of-the-art inductive charging efficiency may be in the low nineties, which is less than the 94-97% charging efficiency that is desirable and that is achievable via corded plug-in chargers (e.g., 93% vs 96.5%).

Another recent way to obtain hands free autonomy with high transfer efficiency is use of a robot function in the charger to align a hot contact connection with the charge port on a stationary vehicle. This does not solve the environmental robustness issues with hot contacts, and adds cost, reliability concerns and possibly more clutter to the already crowded urban environment.

Therefore, it is desirable to provide a hands-free, ground-level inductive charger that would be well suited to uncontrolled parking environments (like apartment parking lots and public garages) for overnight charging and is durable enough to withstand environmental factors. It is further desirable for the charging of the electric vehicle to make use of the precision of autonomous vehicle parking and modern circuit topologies, such that the ground-level inductive chargers may be as efficient as corded plug-in chargers in charging the electric vehicle.

BRIEF DESCRIPTION OF THE INVENTION

In accordance with one aspect of the present invention, a charging system for charging an electric vehicle comprises an inductor-inductor-capacitor (LLC) battery charger that includes an isolation transformer having a transformer primary and a transformer secondary, the transformer primary included in an inductive charger station of the charging system and the transformer secondary included in an inductive power receiver of the charging system, with the inductive power receiver positioned on the electric vehicle. The LLC battery charger also includes a magnetizing inductor circuit element and a leakage inductor circuit element integrated into the isolation transformer on the transformer primary. The isolation transformer is constructed such that the transformer primary and the transformer secondary are separable from one another, with a selective engaging and disengaging of the transformer primary and the transformer secondary based on movement of the inductive power receiver on the electric vehicle relative to the inductive charger station.

In accordance with another aspect of the present invention, a charging system for inductively charging an electric vehicle comprises an inductive charger station including a docking head comprising a transformer primary having a magnetizing inductor circuit element and a leakage inductor circuit element integrated therein and a base component coupled to the docking head, the base component comprising power conversion circuitry configured to provide a conditioned input power to the transformer primary. The charging system further comprises an inductive power receiver separate from the inductive charger station, the inductive power receiver including a transformer secondary selectively mateable with the transformer primary based on movement of the inductive power receiver relative to the inductive charger station and a rectification circuit configured to provide a conditioned DC output power for recharging the electric vehicle.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIGS. 3-8 are views of the inductive charger station and vehicle on-board inductive power receiver, and components thereof, included in the charging system of FIGS. 1A and 1B, according to an embodiment of the invention.

DETAILED DESCRIPTION

Embodiments of the invention are directed to a system and method for inductive charging of an electric vehicle that provides high efficiency inductive charging. The inductive charging of the vehicle is achieved via a system that is minimally intrusive—both aesthetically and from an infrastructure perspective—to a surrounding environment, and is provided via an autonomous interaction between the electric vehicle and a charging station that provides self-alignment and mating between the electric vehicle and the charging station.

Figure 1A:
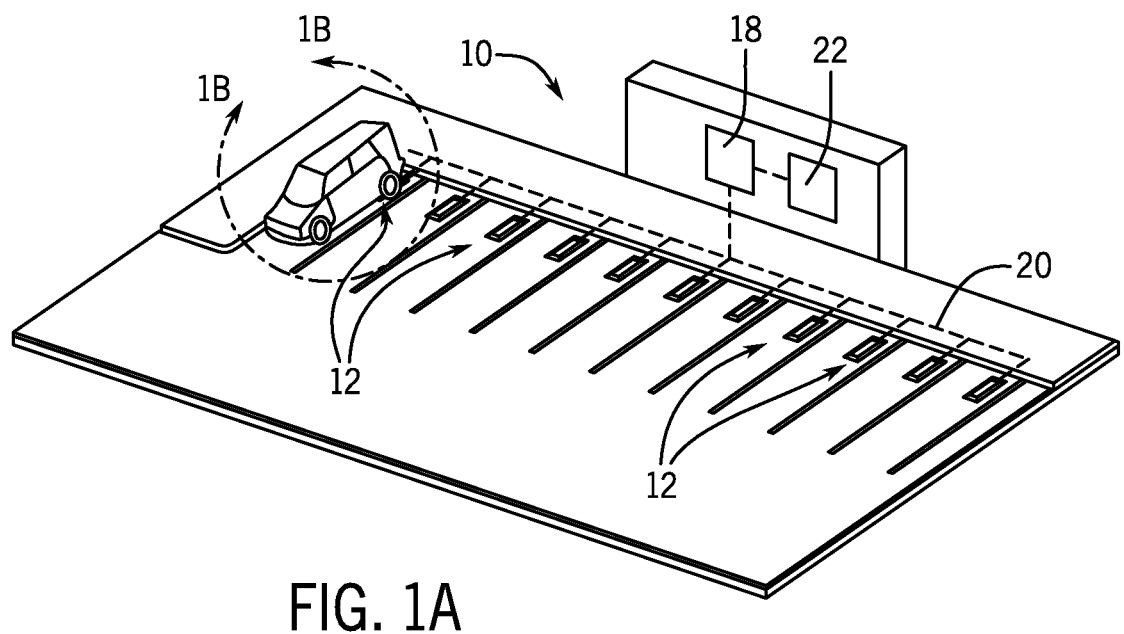
FIGS. 1A and 1B are pictorial diagrams of a charging system for charging electric vehicles, according to an embodiment of the invention.
Figure 1B:
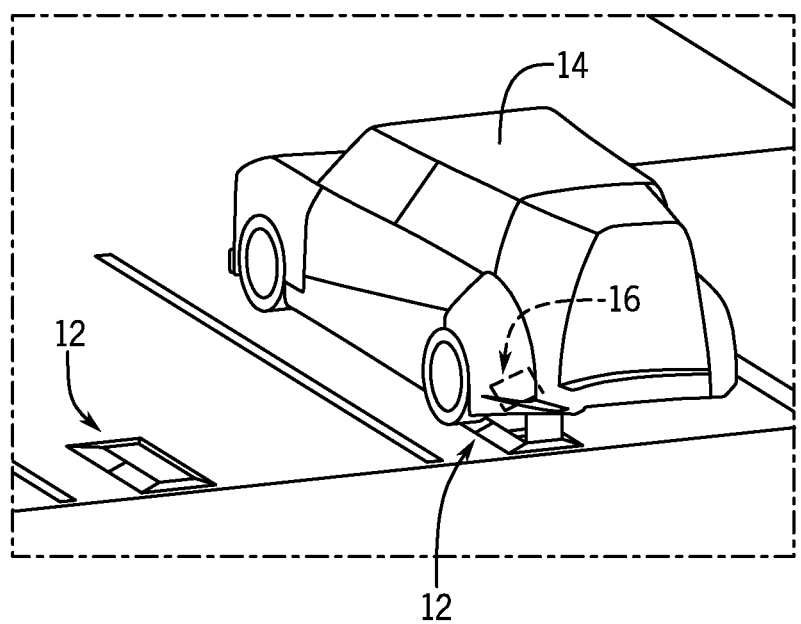

Referring first to FIGS. 1A and 1B, the infrastructure of a charging system 10 is illustrated according to an embodiment of the invention. Charging system 10 includes a plurality of inductive charger stations 12 configured to provide inductive charging to respective electric vehicles 14 that may be positioned to mate therewith, with one vehicle 14 being shown in FIGS. 1A and 1B. In an exemplary embodiment, an inductive charger station 12 is provided for a number of respective parking spots in which vehicles 14 may be parked for an extended period of time, such as overnight parking in an apartment or condominium parking lot for example. As will be explained in greater detail below, the inductive charger stations 12 are constructed so as to be relatively flush with the ground when not in use and then translate to an upright, raised charging position when a vehicle 14 comes into the immediate proximity thereof and a charging of the vehicle is desired or requested, with the inductive charger station 12 mating with an inductive power receiver 16 of the vehicle 14 that, according to one embodiment, may be mounted beneath the rear bumper of the vehicle. FIG. 1B illustrates one inductive charger station 12 in the raised position (where vehicle 14 is present) and the other inductive charger stations 12 in the down position.

As further shown in the illustrated embodiment of FIG. 1A, the charging system 10 also includes an AC-DC power converter 18 that provides power to each of the inductive charger stations 12 via a DC bus 20. In an exemplary embodiment, the AC-DC power converter 18 comprises a single, wall-mounted panel positioned near the AC utility feed circuit breaker panel 22 (i.e., utility panel) so as to provide for easy connection thereto. The bulk AC-DC conversion elements of the power converter 18 are fed with a minimum number of AC circuit breakers, thereby conserving space in the utility panel. The AC-DC power converter 18 may operate, for example, as a 12 kW AC to ~400 V DC wall panel to feed the multiple inductive charger stations 12, with the addition/connection of additional inductive charger stations 12 being enabled with no additional interaction with the utility panel 22. According to one embodiment, the AC-DC power converter 18 can manage charge profiles for all connected charger stations 12 according to historical use patterns with event specific overrides, so as to maximize utilization of the power distribution infrastructure.

Figure 2:
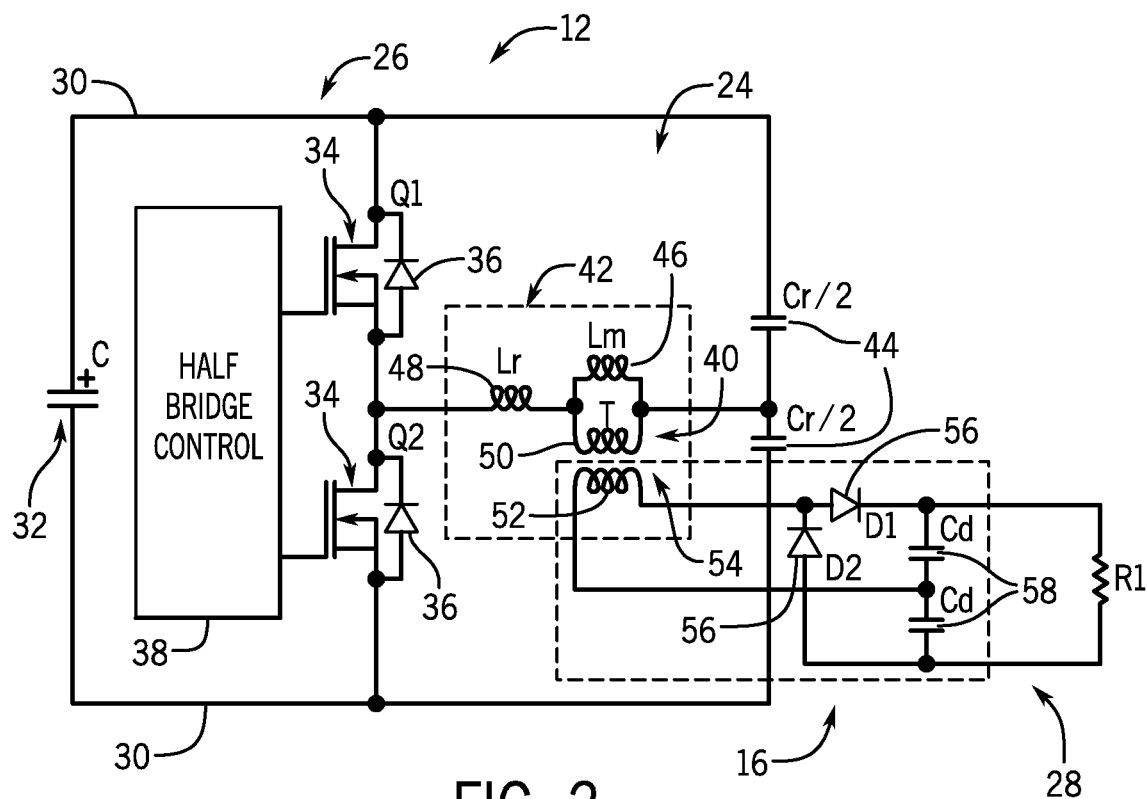
FIG. 2 is a circuit schematic diagram of the inductive charger station and vehicle on-board inductive power receiver included in the charging system of FIGS. 1A and 1B, according to an embodiment of the invention.
Figure 3:
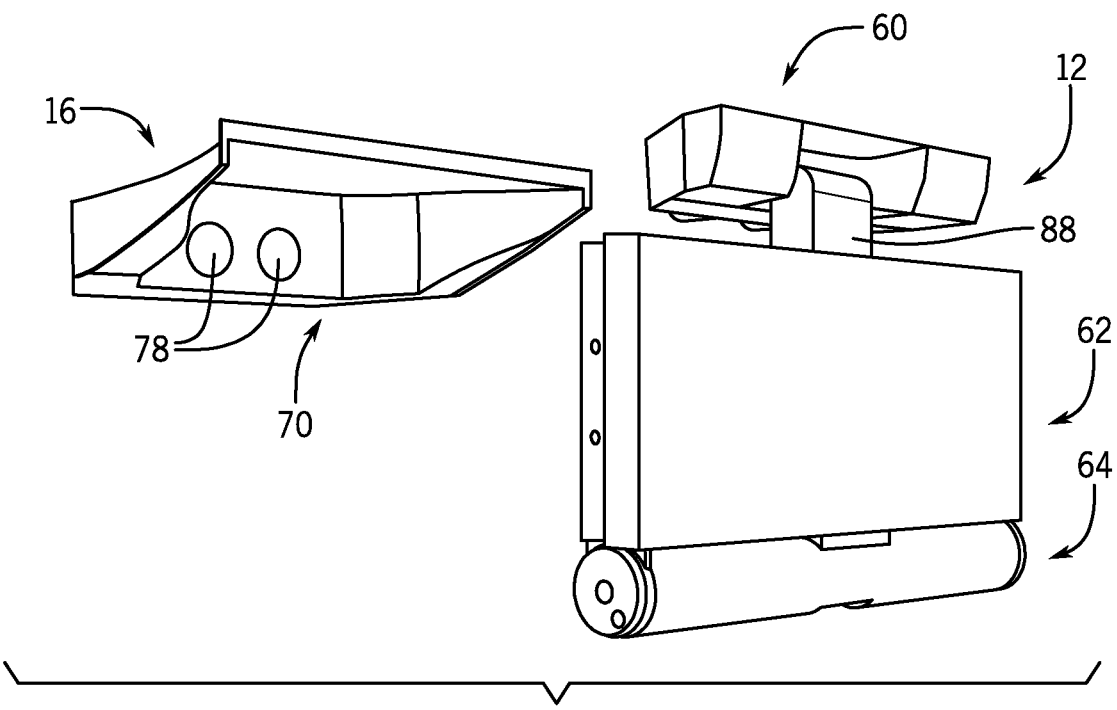

In providing charging to an electric vehicle 14, an inductive charger station 12 mates with the inductive power receiver 16 of a docking vehicle to form a single transformer that can be assembled each time an electric vehicle 14 parks and can be disassembled each time an electric vehicle 14 departs. Referring now to FIG. 2, a circuit schematic diagram of the inductive charger station 12 and of the on-board inductive power receiver 16 of the vehicle 14 are provided to better illustrate the transformer arrangement, as well as the power conversion electronics included in the inductive charger station 12 and the inductive power receiver 16, according to an embodiment of the invention.

As shown in FIG. 2, an inductor-inductor-capacitor (LLC) resonant half-bridge converter circuit 24—which can also be referred to herein as an LLC battery charger—is provided that includes an input stage 26 and an output stage 28. The input stage 26 of the LLC resonant circuit 24 is included in the inductive charger station 12 and is connected to a DC bus 30 to receive DC power therefrom. The DC bus 30 may include a capacitor or capacitor bank 32 that provides smoothing to the input DC power provided to circuit 24, such as from the wall mounted AC-DC power converter 18 (FIG. 1A), for example. In one example, such as when providing power to an interleaved transformer arrangement consisting of two instances/arrangements of circuit 24, the DC bus may comprise two independent 400V busses that can be derived from two independent boost circuits typically running off single phase circuits, or from a +/−400V system (i.e., AC-DC power converter 18) running off a 480V three phase service, as will be explained in greater detail below.

The input stage 26 includes a plurality of switches 34 and diodes 36 that, as demonstrated in the example of FIG. 2, are arranged as a half-bridge circuit. According to one embodiment, the switches 34 may be in the form of metal oxide semiconductor field effect transistors (MOSFETs) that are controlled by switching signals received from a half-bridge controller 38 in order to output an alternating voltage suitable for transferring power through a transformer, although it is recognized that other suitable solid-state switches could instead be employed—including insulated gate bipolar transistors (IGBTs), bipolar junction transistors (BJTs), integrated gate-commutated thyristors (IGCTs), gate turn-off (GTO) thyristors, or Silicon Controlled Rectifiers (SCRs), for example. While the LLC resonant circuit 24 is shown in FIG. 2 as including a half-bridge circuit, it is recognized that other topologies could be utilized, including a full bridge circuit, for example.

As shown in FIG. 2, the input stage 26 includes a primary side 40 of an integrated transformer 42 that is configured to conduct a primary resonant current in response to the activation and deactivation of the MOSFETs 34. The input stage 26 also includes a pair of resonance capacitors 44 that, in the illustrated embodiment, are provided as a split resonance capacitor, so as to reduce the current stress in each capacitor and, in certain conditions, any initial imbalance of the voltage applied to the transformer 42 at start. However, it is to be understood that the input stage 26 could alternatively just include a single one of the pair of resonance capacitors 44, positioned at an output of MOSFETs 34.

In the example of FIG. 2, the integrated transformer 42 includes a magnetizing inductor circuit ($L_M$) 46, a leakage inductor circuit ($L_r$) 48, and a primary winding 50 (that provides an inductive coupling with a secondary winding 52), with the magnetizing inductor circuit 46 and leakage inductor circuit 48 being integrated into the transformer to form an "integrated magnetic." According to an embodiment of the invention, the leakage inductor circuit 48 is integrated into the main transformer 42 and replaces the resonance function (i.e., discrete resonant inductance) of the inductor circuit 46 with leakage inductance, arranging that leakage in a high power transformer that separates each time the inductive power receiver 16 of electric vehicle 14 disengages from inductive charger station 12 and assembles each time the inductive power receiver 16 of electric vehicle 14 mates with the inductive charger station 12. More specifically, the geometry and arrangement of integrated transformer 42 is controlled and provided such that a desired ratio of $L_M$ to $L_r$ is provided—with $L_M$ being recognized as a "parasitic" and $L_r$ being a result of the geometry/arrangement of the transformer.

According to one embodiment, the inductive charger station 12 and inductive power receiver 16 may comprise two integrated transformers 42 rather than the single integrated transformer 42 shown in FIG. 2. In such an embodiment, the two transformers 42 may be provided as an interleaved transformer arrangement including a pair of transformers fed by a pair of primary circuits 24 feeding a set of secondaries 54 that combine the voltage once inside the car, with the transformers 42 being separable—i.e., separable primary and secondary transformer sides for each transformer, based on the inclusion of primary side 40 in inductive charger station 12 and a secondary side 54 in inductive power receiver 16 for each transformer. The integrated transformers 42 may thus include a pair of interleaved primary transformer halves, where one transformer delivers 3 to 6 kW and the other transformer also delivers 3 to 6 kW, causing the pair to deliver 6 to 12 kW—with 3.6/7.2 kW and 5/10 kW deliveries being suitable power levels provided by the transformer halves, for example. In practice, one or two transformer halves may be provided in inductive charger station 12 and inductive power receiver 16 (as will be explained in greater detail below), with the transformer(s) thus delivering half power or full power depending on the chosen construction of inductive charger station 12 and inductive power receiver 16.

As further shown in FIG. 2, the output stage 28 of LLC resonant circuit 24 is included in the inductive power receiver 16 of electric vehicle 14, as part of a vehicle charger circuit, and is configured to conduct an output voltage and current for recharging of one or more energy storage devices (not shown) on the vehicle 14. In response to the oscillation of the primary resonant current through the primary winding 50, the secondary winding 52 of the transformer 42 that is included in the output stage 28 generates the output current based on the magnetic flux through the core of the transformer. In the example of FIG. 2, the output stage 28 includes an arrangement of diodes 56 and capacitors 58 that condition the output current in a desirable manner, i.e., rectification and filtering, for example, to provide an appropriate DC power for recharging the electric vehicle 14. However, it is recognized that there are many different arrangements of diodes or switches that can be implemented for transformer waveform rectification, and the specific arrangement of output stage 28 in FIG. 2 is shown merely for reasons of clarity. For example, an arrangement of solid-state switches such as synchronous FETs or IGBTs could be implemented in the output stage 28 for performing rectification, and it is recognized that various types of active or passive rectification methods could be performed by output stage 28.

With regard to the construction of the LLC resonant half-bridge converter circuit 24 illustrated in FIG. 2, the integration of the leakage inductor circuit 48 (and magnetizing inductor circuit 46) into the main transformer 42, and the arranging of leakage inductance in a high power transformer that separates and assembles based on the engaging/disengaging of the primary 50 and secondary 52 of the inductive charger station 12 and inductive power receiver 16, respectively, enables a highly efficient inductive charging of the electric vehicle 14. That is, it is recognized that bumper covers and other plastic elements that cover inductive charger station 12 and inductive power receiver 16 are essential for providing protection thereto and increasing the longevity thereof (e.g., to provide for 10,000 charging cycles of operation), but that the separation in the magnetic structure (i.e., primary 50 and secondary 52 of transformer 42) caused by these plastic coverings prevents ideal coupling and creates leakage inductance. The construction of the LLC resonant converter circuit 24 is such that this separation in the magnetic structure and the intrinsic leakage inductance created thereby is treated as beneficial, as it allows for the foregoing of a discrete resonant inductor in the circuit and instead utilizes the single assembled magnetic structure to establish resonance. Specifically, the leakage inductor circuit 48 operates to smooth an input current received thereby and generate an easy to manage sinusoidal current waveform that allows for a separation of the transformer primary and secondary 50, 52 in the respective inductive charger station 12 and inductive power receiver 16, using the leakage inductance to establish resonance. It is recognized that the leakage inductance is a function of the intrinsic specific geometry of the separable transformer 42, with the geometry thereof affecting the $L_m$ and $L_r$ and the electrical efficiency that is delivered/achieved by circuit 24. While an L-L core with nested windings transformer structure is shown and described in more detail below, it is recognized that other separable transformer geometries that can be assembled and disassembled through motion on a single axis can be implemented according to additional embodiments of the invention. Beneficially, embodiment of the invention—based on the inclusion of LLC resonant converter circuit 24 in inductive charger station 12 and inductive power receiver 16—is thus able to deliver 94% or greater charging efficiency (e.g., 94-97%), providing an effective, robust, hands-free, inductive charging solution, when constructed in this way.

Referring now to FIGS. 3-8, a construction of the inductive charger station 12 and the inductive power receiver 16 on vehicle 14 are shown in greater detail, according to various views thereof. The construction of the inductive charger station 12 and the inductive power receiver 16 are such that a physical arrangement of circuit elements therein may be achieved via self-aligning of the transformer halves (i.e., primary and secondary sides 40, 54) during parking or docking without friction loading the insulation covering electronic elements, and while still obtaining a very close tolerance assembly in the active regions. While inductive charger station 12 is described here below as a rotatable charging station movable between an upright charging position and a lowered storage position—including a distinct docking head 60, base component 62, and pivot member 64, with the pivot member allowing for such rotation—it is recognized that embodiments of the invention are not to be limited to this specific structure. That is, according to another embodiment, the inductive charger station 12 may be constructed as a pedestal dock that permanently remains in an upright charging position and is not capable of rotating down to a folded storage position (i.e., no pivot member 64 to provide for such rotation). Accordingly, it is understood that embodiments of the invention are not to be limited strictly to the specific charger station 12 construction described here below.

As shown first in FIGS. 3-7, the inductive charger station 12 is generally composed of a docking head 60, a base component 62, and a pivot member 64—with the inductive charger station 12 also including a housing 66 for storing the docking head 60, base component 62, and pivot member 64 when in a down position. The docking head 60 is composed of a contoured body 68—including one or more protrusions 69 extending out therefrom—that is shaped to mate with a cavity 70 formed in inductive power receiver 16, with an exemplary embodiment of the docking head 60 including a pair of protrusions 69 formed thereon. A ferrite transformer core 72 is affixed to (and housed within) the body 68 and has primary windings 50 of the transformer 42 (FIG. 2) wound thereon. The ferrite transformer core 72 is formed from one or more L-shaped legs or members 74, with two legs 74 being shown in the illustrated embodiment. In an embodiment where the core 72 comprises two legs 74, the pair of legs 74 collectively form an "L-L core." According to an exemplary embodiment, the L-L core 72 has nested windings 50 wound thereon that are split on the two legs 74 to form a transformer pair (i.e., two transformer 42) that can operate in an interleaved fashion. However, it is recognized that the core 72 could be populated with only a single transformer (i.e., windings 50 on only one leg 74), according to another embodiment of the invention, so as to produce half power as compared to the two transformer arrangement (e.g., 3.6 kW vs. 7.2 kW). The contoured body 68, as well as the transformer core 72 and primary winding legs 74 of transformer 42, are covered with a protective coating or covering 76, such as an electrically insulating and durable polymer/plastic material, having an appropriate wall thickness (e.g., 2 mm). Additionally, the covering 76 provided over primary windings 50 and transformer core legs 74 may be tapered so as to fit into the receptacles 78 of inductive power receiver 16 to enable a very close and repeatable positioning between the primary and secondary windings 50, 52 of the transformer 42 while experiencing minimal sliding friction or abrasion, as will be explained in greater detail below.

In one embodiment, docking head 60 further includes a communications connection 79 that provides for alignment verification of the docking head 60 with the inductive power receiver 16 and provides redundant communication about battery bus voltage and current. The communications connection may comprise an optical, infrared or other near-field communications port that communicates with a corresponding optical, infrared, or other near field communications port on the inductive power receiver 16 to form a communications path therebetween, thereby verifying alignment between the components and allowing for voltage control to regulate the charge/voltage going into the battery of the electric vehicle.

Figure 5:
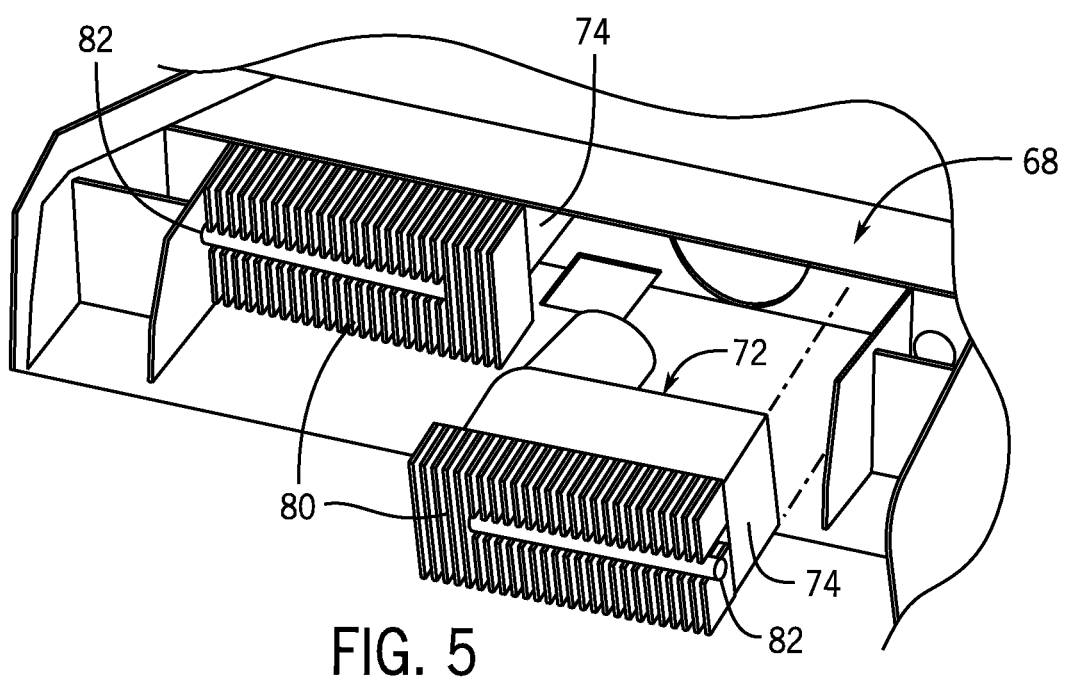

As shown in FIG. 5, in one embodiment, docking head 60 further includes a pair of heat sinks 80 mounted to the L-L core 72 to provide cooling to the transformer 42. The heat sinks 80 are mounted to a back surface of the core legs 74, opposite from the protrusion about which windings 50 are wound, so as to draw heat from the core legs 74. In an exemplary embodiment, a heat pipe 82 is integrated with each heat sink 80 to provide additional cooling capability. A cooling fluid is circulated through the heat pipe 82 to remove additional heat from core legs 74, thereby keeping the transformer 42 cool while transferring power through the requisite layers of plastic 76 on docking head 60 (and inductive power receiver 16). While not shown in FIG. 5, it is recognized that one or more air moving devices—such as fans or synthetic jet actuators—may be positioned adjacent heat sinks 80 to increase the rate of cooling provided from heat sinks 80 and heat pipes 82.

Figure 4:
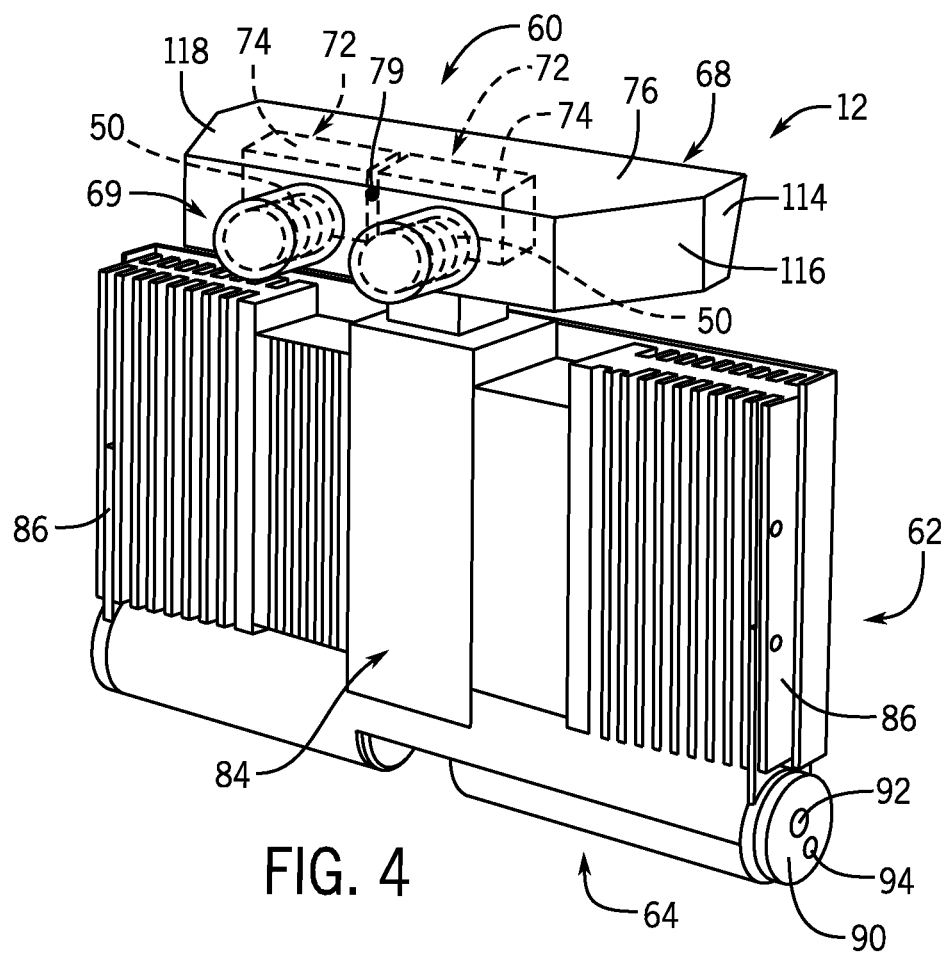

As shown in FIG. 4, the base component 62 of inductive charger station 12 generally includes a central region 84 that houses the packaged electronics of power conversion circuitry (i.e., MOSFETS 34 and controller 38 of LLC resonant circuit 24, FIG. 2) of the inductive charger station 12, and a pair of convective heat sinks 86 positioned on opposing sides of the central region 84. The heat sinks 86 and central region 84 collectively form a box-shaped base component 62, with the heat sinks 86 configured to support a load that might be applied down onto inductive charger station 12 when the inductive charger station 12 is folded flat to its down position at ground level. According to an embodiment where an interleaved transformer pair is provided on the L-L core 72 of docking head 60, both of the heat sinks 86 may provide convective cooling to the DC-DC power conversion circuitry (i.e., LLC resonant converter circuit 24, FIG. 2) housed in base component 62. In an alternative embodiment, one of heat sinks 86 may provide convective cooling to the DC-DC power conversion circuitry housed in base component 62, while the other heat sink 86 may provide convective cooling for a power factor correction boost operation, such as for 3 kW power provided direct from an AC source in shaded applications.

The docking head 60 is mounted to base component 62 via a spring suspended post 88 that extends therebetween. The post 88 allows for a limited degree of rotation or movement of the docking head 60 relative to the base component 62, so as to allow for slight adjustments of the docking head 60 position/orientation when mating with the inductive power receiver 16. As an example, the post 88 allows for a wobble of the head 60 to accommodate assembly tolerance and suspension motion as the vehicle 14 is unloaded, as will be explained in further detail below.

Figure 6:
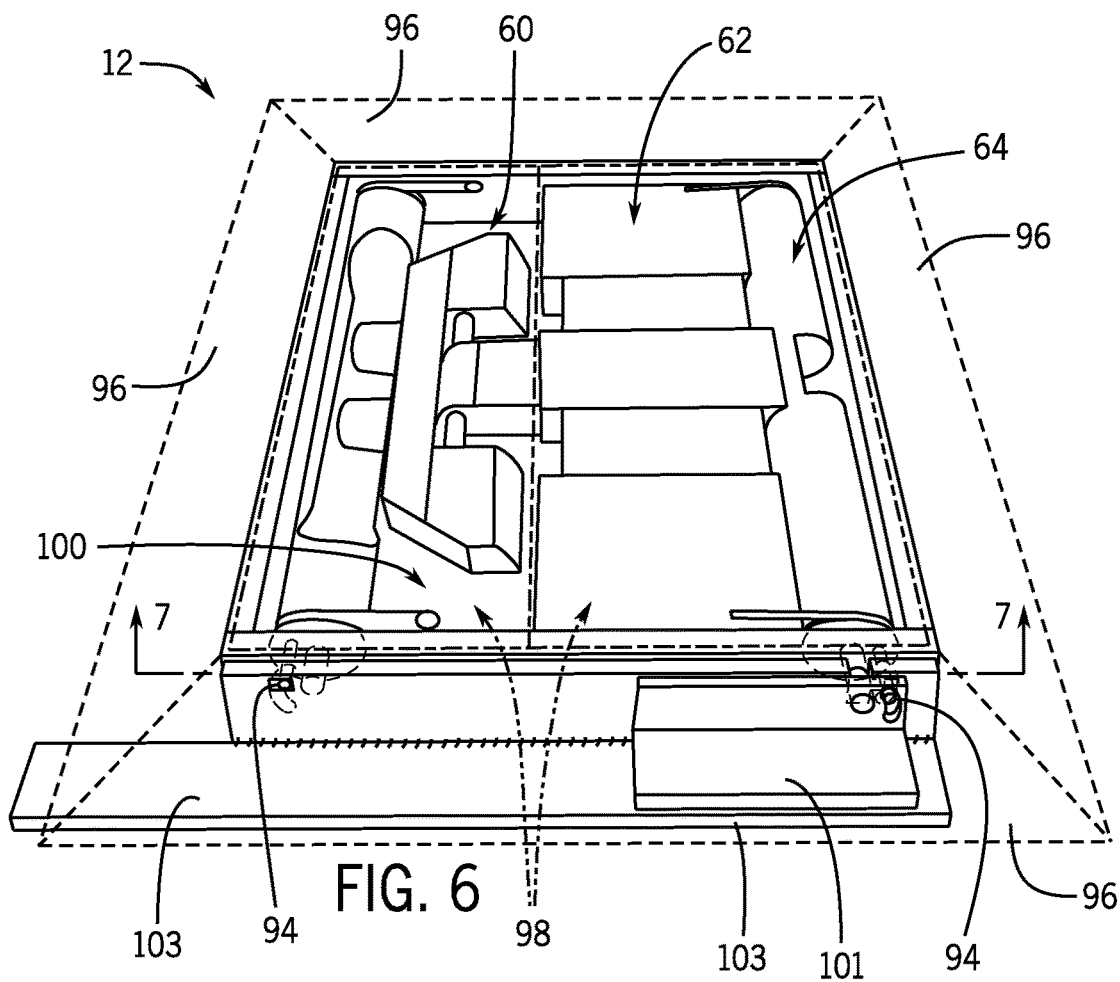

As shown in FIGS. 4, 6, and 7, pivot member 64 allows for rotation of the inductive charger station 12 (i.e., of docking head 60 and base component 62) between a down position and an upright position. The pivot member 64 is affixed to a bottom edge of base component 62 and is cylindrical in shape, with the member including an end cap 90 thereon having a pivot hole 92 and pin 94 thereon to selectively enable and inhibit rotation of the pivot member 64 and inductive charger station 12 as a whole. The pivot member 64 may be rotated via any of a number of suitable methods, such as via an electromechanical motor or component (not shown) housed in pivot member 64 that effects the rotation, or via an actuator member or plate 103 (that may include, for example, a stiff spring) that causes a pivoting of the pivot member 64 responsive to the weight of the vehicle 14 driving over the member (but not to lighter weights, such as the weight of people and pets, for example).

In operation of inductive charger station 12, the pin 94 of pivot member 64 may be selectively engaged and disengaged with end cap 90 to enable and inhibit rotation of the inductive charger station 12 to its upright position. That is, when pin 94 is engaged, rotation of the inductive charger station 12 is enabled, and the pivot member 64 may cause base component 62 to rotate responsive to actuation of the pivot member by an electromechanical motor or a weight of the vehicle. When the pin 94 is not engaged, rotation of the inductive charger station 12 is inhibited, with the pivot member 64 undergoing a "free rotation" that does not engage base component 62 and result in a corresponding rotation thereof. To cause movement of the pin 94 to the engaged position, any of a variety of means can be employed, including for example a solenoid or phase change wax that causes movement of the pin 94 to the engaged position.

It is recognized that system controls may be employed to unlock the inductive charger station 12 from its down position and be raised to the upright position for the correct vehicle. In a highly controlled environment, such as a garage, no lock may be needed, and thus no strict system controls may be necessary—such that the weight of electric vehicle 14 itself is the only input required for "unlocking" of the inductive charger station 12—with the weight of electric vehicle 14 causing compression of the actuator member 103 and a corresponding rotation of the inductive charger station 12 to the upright position, as previously explained. In another embodiment, communication between the electric vehicle 14 and the inductive charger station 12 may be required to unlock the inductive charger station 12. That is, a wireless signal may be transmitted from the vehicle 14 to inductive charger station 12 that identifies itself as a vehicle authorized to receive a charge from the inductive charger station 12. Upon receipt of the wireless signal, the inductive charger station 12 may then be unlocked and rotation of the inductive charger station 12 to the upright position is allowed—with such rotation being provided by an electromechanical motor that is activated upon receipt of the vehicle identification signal or by the interaction of the vehicle 14 with the actuator member 103 of the inductive charger station 12.

With regard to the outer housing 66 of inductive charger station 12, FIG. 6 illustrates the inductive charger station 12 in its down position and the construction of housing 66, according to an exemplary embodiment. As can be seen, housing 66 is constructed to have a generally flat profile, with bezeled side surfaces 96 (at no more than a 15° angle, for example) leading up to a flat top cover or surface 98, such that the inductive charger station 12 extends only a minimal distance above ground level, such as 2.5 inches for example. The bezeled surfaces 96 surround an interior cavity 100 that houses the docking head 60, base component 62, and pivot member 64, with the moveable cover 98 being provided over cavity 100 that protects the docking head 60, base component 62, and pivot member 64 from the environment when the inductive charger station 12 is in the down position and the cover 98 is closed. The bezeled surfaces 96 of housing 66 allow for a vehicle to easily drive over the inductive charger station 12 and minimize its footprint on the surrounding environment. In one embodiment, where a separate wall mounted AC-DC boost converter is not present in the charging system 10 (FIG. 1A), a power feed may be provided on one of the bezeled surfaces 96, and the housing 66 may house AC-DC power conversion elements therein (i.e., AC to ~400 V DC conversion), such that the inductive charger station 12 may be directly connected to an AC source.

While inductive charger station 12 and housing 66 thereof is shown as extending above ground and defining a cavity 100 within which docking head 60, base component 62, and pivot member 64 are housed, it is recognized that alternative embodiments of the invention may be implemented where the inductive charger station 12 is flush with the ground. In such an embodiment, a cavity may be formed in the ground to receive the docking head 60, base component 62, and pivot member 64, thereby further minimizing the footprint of the inductive charger station 12 on the surrounding environment.

Additionally, according to one embodiment of the invention, a weight of electric vehicle 14 driving onto the inductive charger station 12 (e.g., onto the actuator member or plate 103 of the charger) may cause a chock or curb-like structure 101 to be raised up from ground as part of housing 66 or adjacent to housing 66, as shown in FIGS. 6 and 7. The chock 101 may raise up from the ground upon the weight of the vehicle 14 being applied to the actuator plate 103, which in turn actuates pins 94 of end caps 90. That is, upon a tire pressing down on the plate 103, the pins 94 are forced to traverse down along kidney shaped slots (that follow a radius around the pins 94 around which pivot member 64 and pivot member 107 rotate) formed in housing 66 and plate 103, which causes the covers 98 to open and present the charger 12 and also causes the chock 101 to rotate up around a same center of rotation as the pivot member 64. The chock 101 functions as a stop for the vehicle 14 when the vehicle is being aligned with the inductive charger station 12—either via a manual alignment performed by the driver or via an automatic alignment performed by an autonomous vehicle. The chock 101 may then retract back into the ground upon the vehicle 14 disengaging from the inductive charger station 12. According to one embodiment, a surface cover 96 located in-board of the wheel of vehicle 14 may also rotate up upon the weight of the vehicle 14 being applied to actuator plate 103, such that the wheel is secured on two sides thereof.

Figure 8:
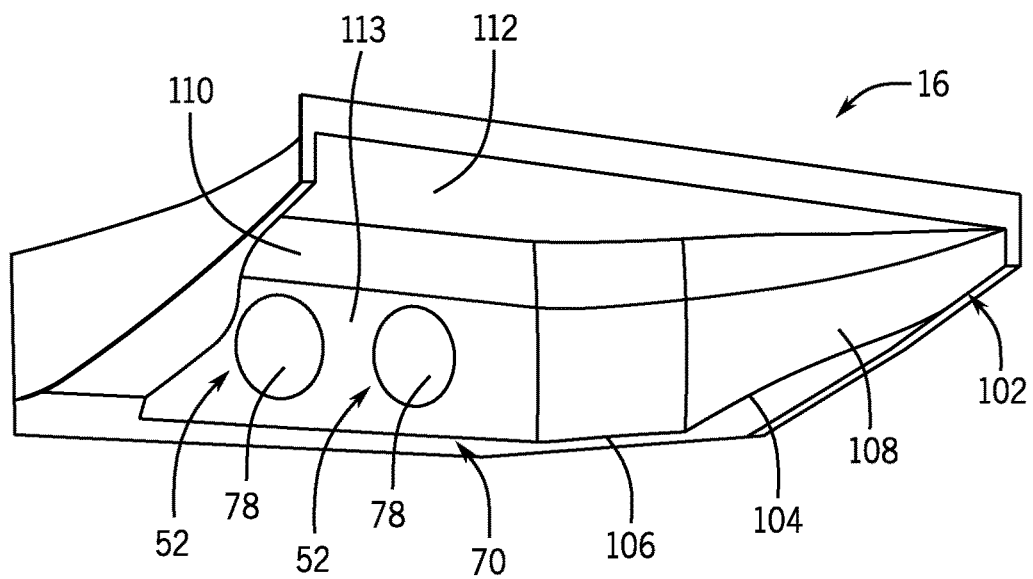

Referring now to FIG. 8, a structure of the inductive power receiver 16 on electric vehicle 14 is illustrated in greater detail. The inductive power receiver 16 generally comprises a housing 102 and power electronics circuitry (as illustrated in FIG. 2) that provide for receiving of and interaction with inductive charger station 12. The housing 102 defines a cavity 70 for receiving docking head 60 therein—including one or more receptacles 78 configured to receive the one or more protrusions 69 of the docking head 60. In an exemplary embodiment, a pair of receptacles 78 are provided in housing 102 that are similar in appearance to a dual exhaust on an internal combustion engine. The receptacles 78 receive the protrusions 69 of the docking head and the legs 74 of L-L transformer core 72 therein (or only a single L core) for positioning of the primary windings 50 in close position to the secondary windings 52 of inductive power receiver 16, with the secondary windings 52 encircling the receptacles 78 such that they are placed next to primary windings 50. That is, the receptacles 78 are configured to accept the primary halves of the transformers 42 of inductive charger station 12 that can operate in an interleaved fashion, or can accept the single transformer 42 of inductive charger station 12, with no discernible difference to an observer. While not shown in FIG. 7, it is recognized that inductive power receiver 16 includes therein transformer core halves/legs (i.e., an L-L core) that corresponds with the L-L core 72 of inductive charger station 12, with the core being incorporated within housing 102.

Similar to the protrusions 69 of the docking head 60, receptacles 78 (as well as the transformer core halves/legs surrounding receptacles 78), are covered with a protective coating or covering 76, such as an electrically insulating and durable polymer/plastic material, having an appropriate wall thickness (e.g., 2 mm). According to one embodiment of the invention, the coating 76 covering each of protrusions 69 and receptacles 78 (or just one of the components) may be formed of an ultra-high molecular weight polyethylene that reduces friction during alignment/mating of the protrusions 69 with receptacles 78. According to another embodiment, rollers may be integrated into (on or just under the surface) protrusions 69 and/or receptacles 78 to provide friction reduction between protrusions 69 and receptacles 78 during alignment/mating thereof. Via use of such coating materials and/or rollers, wear on the docking head 60 of inductive charger station 12 and the inductive power receiver 16 can be minimized, so as to increase the longevity of these components.

For properly aligning the receptacles 78 of inductive power receiver 16 with the L-L core 72 and the primary winding(s) 50 of docking head 60, a set of alignment features are provided on housing 102 that—when acting together—form a funnel for motion in a plane parallel to the ground. The alignment features include a flat section 104 and a tapered section 106 that are fed with a stepped taper section 108. The alignment features also include a substantially planar downward facing reference surface 110 fed with a radius or a gradual funnel 112 that can push the docking head 60 of the inductive charger station 12 down to align transformer elements (i.e., primary and secondary transformer components). Additionally, according to an exemplary embodiment, inductive power receiver 16 includes a communications connection 113 (e.g., optical, infrared or other near-field communications port) on housing 102 that interacts with communications connection 79 on docking head 60 to provide for alignment verification therebetween and provide communication about battery bus voltage and current in the electric vehicle 14, so as to regulate the charge/voltage going into the battery thereof.

The alignment features of the inductive power receiver housing 102 correspond with a set of alignment features on the docking head 60, with such features on the docking head 60 being formed along the top and front portions thereof that most closely interact with the inductive power receiver 16. Specifically, a flat portion 114 and a taper portion 116 (FIG. 4) are formed on sides of docking head 60 that act in combination with a spring centered travel feature (i.e., post 88) to follow the stepped taper 108 of inductive power receiver housing 102, thereby accommodating left-to-right misalignment of the vehicle 14 with respect to the inductive charger station 12 (e.g., up to 3 inches of misalignment) and properly locating the mating parts of the head and receiver housing before nesting occurs, with only one degree of freedom remaining for the last 40-50 mm of travel of the head/receiver. The alignment features on the docking head 60 also include a substantially flat top 118 that obtains planar alignment with the inductive power receiver housing 102 before the electronically active part of the docking head 60 mates with the receiver 16. This alignment is facilitated by a nose down natural position of the docking head 60, so that when the radius 112 on the inductive power receiver housing 102 contacts the docking head 60, the head 60 pivots up to match the planar orientation of the receiver 16. Simultaneously the spring suspended post 88 of docking head 60 moves to accommodate any variation in vehicle height. The tapered covers over the primary windings 50 therefore are aligned to fit into the dual exhaust-like receptacles 78 of inductive power receiver 16, such that the primary and secondary windings 50, 52 are positioned in a very close and repeatable relationship, while experiencing no sliding friction or abrasion therebetween.

As indicated above, the alignment features present on the inductive charger station 12 (i.e., docking head 60) and inductive power receiver 16 may accommodate misalignment therebetween upon to a certain amount/distance, such as up to 3 inches of misalignment. Thus, it is recognized that in order for the electric vehicle 14 to successfully receive inductive charging, it is necessary to be able to bring the inductive power receiver 16 into substantial alignment with the inductive charger station 12 in a reliable and repeatable fashion. According to embodiments of the invention, to achieve such alignment, the electric vehicle 14 is in the form of an autonomous vehicle (also known as a driverless car, auto, self-driving car, robotic car, etc.), which is understood to refer to a vehicle that is capable of sensing its environment and navigating without human input.

Figure 9:
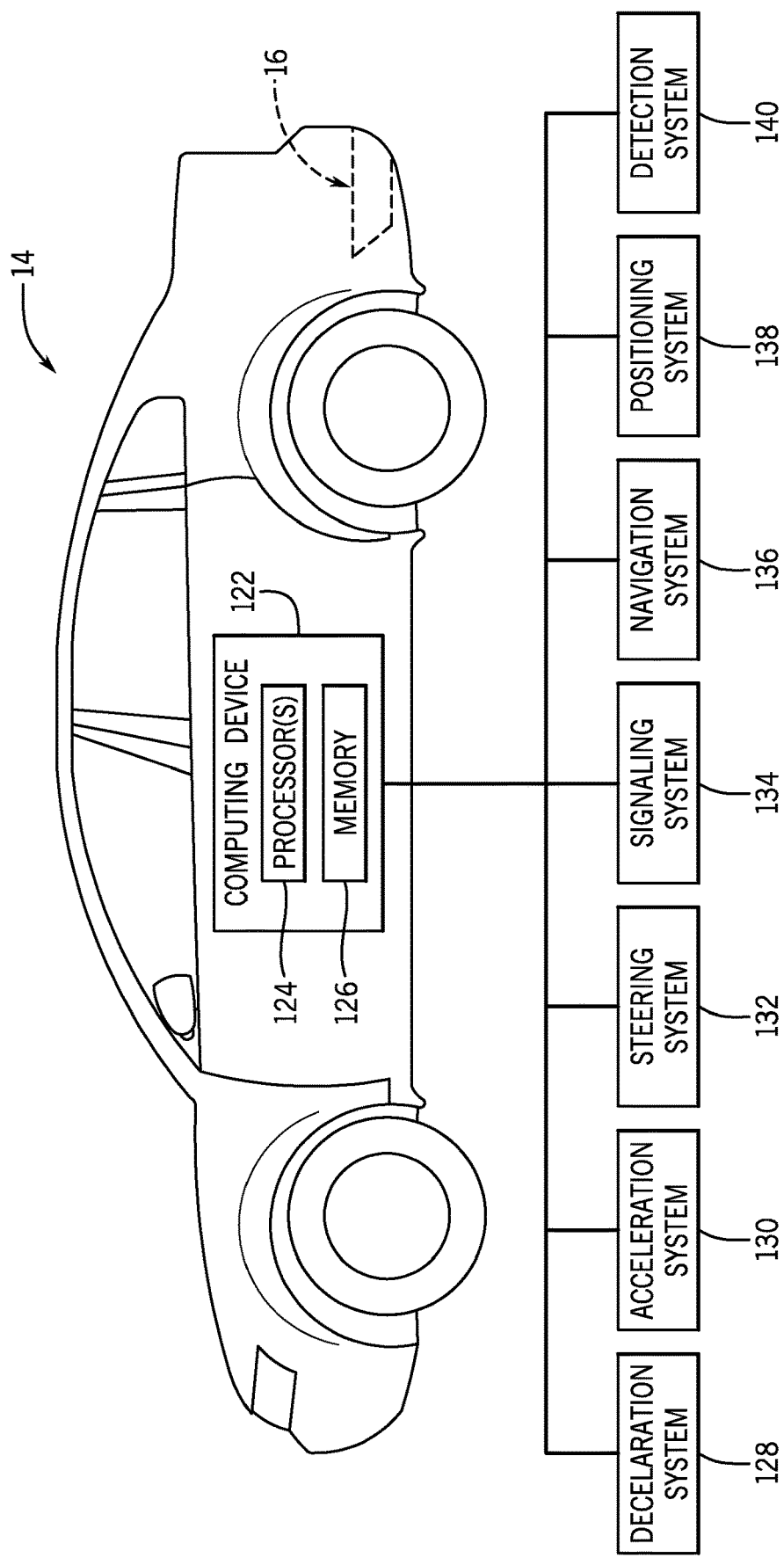
FIG. 9 is a block schematic diagram of an autonomous vehicle mateable with the inductive charger station of FIGS. 1A and 1B, according to an embodiment of the invention.

Referring now to FIG. 9, an autonomous electric vehicle that may incorporate inductive power receiver 16 and be utilized to provide alignment with the inductive charger station 12 is illustrated according to one embodiment. To function as an autonomous vehicle, the vehicle 14 may have one or more computing devices, such as computing device 122 containing one or more processors 124, memory 126 and other components typically present in general purpose computing devices. In one example, computing device 122 may be an autonomous driving computing system incorporated into vehicle 14. The autonomous driving computing system may be capable of communicating with various components of the vehicle. For example, referring to FIG. 9, computing device 122 may be in communication with various systems of vehicle 14, such as deceleration system 128, acceleration system 130, steering system 132, signaling system 134, navigation system 136, positioning system 138, and detection system 140 in order to control the movement, speed, etc., of vehicle 14 in accordance with instructions provided in memory 126. While these systems are shown as external to computing device 122, in actuality, these systems may be incorporated into computing device 122, again as an autonomous driving computing system for controlling vehicle 14.

As an example, computing device 122 may interact with deceleration system 128 and acceleration system 130 in order to control the speed of the vehicle. Similarly, steering system 132 may be used by computer 122 in order to control the direction of vehicle 14. For example, if vehicle 14 is configured for use on a road, such as a car or truck, the steering system may include components to control the angle of wheels to turn the vehicle. Signaling system 134 may be used by computing device 122 in order to signal the vehicle's intent to other drivers or vehicles, for example, by lighting turn signals or brake lights when needed.

Navigation system 136 may be used by computing device 122 in order to determine and follow a route to a location. In this regard, the navigation system 136 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 138 may be used by computing device 122 in order to determine the vehicle's relative or absolute position on a map or on the earth. For example, the position system 138 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 138 may also include other devices in communication with computing device 122, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 122, other computing devices and combinations of the foregoing.

The detection system 140 also includes one or more components for detecting objects external to the vehicle such as other vehicles, obstacles in the roadway, traffic signals, signs, trees, etc. For example, the detection system 138 may include lasers, sonar, radar, cameras and/or any other detection devices that record data which may be processed by computing device 122. In the case where the vehicle is a small passenger vehicle such as a car, the car may include a laser or other sensors mounted on the roof or other convenient location. In an exemplary embodiment, the detection system 140 specifically includes a rearview camera sighting mechanism that allows a human driver have a line-of-sight and viewing of objects behind the vehicle, so as to enable to the driver to be aware of a positioning of such objects and the positioning of the car relative thereto.

The computing device 122 may control the direction and speed of the vehicle by controlling various components. By way of example, computing device 122 may navigate the vehicle to a destination location completely autonomously using data from the detailed map information and navigation system 136. Computer 122 may use the positioning system 138 to determine the vehicle's location and detection system 140 to detect and respond to objects when needed to reach the location safely. In order to do so, computer 122 may cause the vehicle to accelerate (e.g., by increasing fuel or other energy provided to the engine by acceleration system 130), decelerate (e.g., by decreasing the fuel supplied to the engine, changing gears, and/or by applying brakes by deceleration system 128), change direction (e.g., by turning the front or rear wheels of vehicle 14 by steering system 132), and signal such changes (e.g., by lighting turn signals of signaling system 134). Thus, the acceleration system 130 and deceleration system 130 may be a part of a drivetrain that includes various components between an engine of the vehicle and the wheels of the vehicle. Again, by controlling these systems, computer 122 may also control the drivetrain of the vehicle in order to maneuver the vehicle autonomously.

Accordingly, based on operation of computing device 122—and the controlling of various vehicle systems 128-140 performed thereby—the autonomous electric vehicle 14 is able to navigate to the inductive charger station 12 and determine the positioning of the vehicle relative to the inductive charger station 12. More specifically, upon arriving at the charging system 10 (FIGS. 1A and 1B) and the inductive charger stations 12 present thereat, the autonomous electric vehicle 14 may employ the detection system 140—including one or more cameras thereof, such as a rearview camera—to provide visual tracking of the docking head 60 in the upright position. The autonomous vehicle 14 may then function to place itself into alignment in relation to inductive charger station 12 to enable mating of the docking head 60 and the inductive power receiver 16. The autonomous electric vehicle 14 may then control itself to come into contact with the inductive charger station 12 without any additional automated movement of the inductive charger station 12 once in the upright position, at which time the alignment features present on the inductive charger station 12 (i.e., docking head 60) and inductive power receiver 16 may accommodate any slight misalignment therebetween in order to provide for a smooth nesting of the tapered covers 76 on primary windings 50 into the dual exhaust-like receptacles 78 without any friction or wear therebetween.

While description in provided above regarding autonomous operation of the electric vehicle to align and mate inductive power receiver 16 with the inductive charger station 12, i.e., operation/functioning of the electric vehicle as a "positioning robot", it is recognized that autonomous operation of an electric vehicle may also be employed to provide for other types of charging of the electric vehicle. That is, according to other embodiments of the invention, the electric vehicle may be operated in an autonomous manner (as described in detail above) in order to enable "hot contact charging" or other forms of DC fast charging for the electric vehicle. As one example, the electric vehicle may be operated in an autonomous manner to provide alignment and mating of a plug receptacle on the vehicle and a pronged charging station—with such autonomous charging beneficially enabling safe energizing of a series of autonomous vehicles that charge one after another, returning to a non-electrified (less expensive) parking spot after the desired state of battery charge is obtained. Accordingly, it is to be understood that autonomous operation of the electric vehicle for enabling charging thereof is not limited only to inductive charging structures/arrangements.

Beneficially, embodiments of the invention thus provide a hands-free, ground-level, electric vehicle docking, inductive charging system that combines the best attributes of inductive charging (no exposed valuable flexible cords, or galvanic contacts to spark, wear or degrade, low profile/near ground level, clutter free, aesthetically pleasing form) with the best attributes of corded chargers (high efficiency, low on-car weight). The inductive charging system provides an efficient solution for night charging of electric vehicles at apartments and/or other public areas, thus providing high public benefit with minimum public infrastructure expense.

The design of the LLC battery charger in the inductive charging system—i.e., integrated magnetic with a split transformer design—delivers battery charging efficiencies of 94% or greater (e.g., 96.6% DC-DC efficiency at 2.64 kW peak power), while reducing the weight of the required charging components on the vehicle. The LLC battery charger is designed as a modular charger, in that one or two transformers (cores and associated windings) may be present in each of a stationary inductive charger station (transformer primary side) and vehicle-mounted inductive power receiver (transformer secondary side) of the inductive charging system—with the stationary inductive charger station and vehicle-mounted inductive power receiver constructed to have two nesting areas for cores and windings that may be selectively populated with no discernible difference to an observer. The modular charger thus provides for inductive charging via a single transformer or a pair of interleaved primary transformer halves, where one transformer delivers 3 to 6 kW and the other transformer also delivers 3 to 6 kW, causing the pair to deliver 6 to 12 kW—with 3.6/7.2 kW and 5/10 kW deliveries being suitable power levels provided by the transformer halves, for example. Additionally, the inductive charging system accommodates charging for electric vehicles with various bus voltages, with electric vehicles having battery bus voltages of 400 V or 800 V being accommodated by the inductive charging system.

Additionally, the inductive LLC battery charger provides such charging capabilities while adding only minimal weight to the electric vehicle (based on the split transformer construction of the LLC battery charger), with the inductive power receiver on the electric vehicle having a weight of approximately 5 pounds or less (e.g., ~5 lb for a 7.2-10.0 kW interleaved transformer charger and <3 lb for a 3.6-5.0 kW single transformer charger).

Still further, the inductive charging system beneficially makes use of emerging autonomous vehicle capability to provide for accurate and repeatable mating of the electric vehicle with the inductive charger station. The autonomous electric vehicle navigates to the inductive charger station and determines the positioning of the vehicle relative to the inductive charger station, with the electric vehicle then causing itself to come into contact with the inductive charger station in an autonomous manner, without any input/navigating from the driver and without any automated movement of the inductive charger station 12 (once in its upright position). Such autonomous mating of the electric vehicle with the inductive charger station provides a smooth nesting of the inductive charger station with the inductive power receiver of the electric vehicle.

Therefore, according to an embodiment of the invention, a charging system for charging an electric vehicle comprises an inductor-inductor-capacitor (LLC) battery charger that includes an isolation transformer having a transformer primary and a transformer secondary, the transformer primary included in an inductive charger station of the charging system and the transformer secondary included in an inductive power receiver of the charging system, with the inductive power receiver positioned on the electric vehicle. The LLC battery charger also includes a magnetizing inductor circuit element and a leakage inductor circuit element integrated into the isolation transformer on the transformer primary. The isolation transformer is constructed such that the transformer primary and the transformer secondary are separable from one another, with a selective engaging and disengaging of the transformer primary and the transformer secondary based on movement of the inductive power receiver on the electric vehicle relative to the inductive charger station.

According to another embodiment of the invention, a charging system for inductively charging an electric vehicle comprises an inductive charger station including a docking head comprising a transformer primary having a magnetizing inductor circuit element and a leakage inductor circuit element integrated therein and a base component coupled to the docking head, the base component comprising power conversion circuitry configured to provide a conditioned input power to the transformer primary. The charging system further comprises an inductive power receiver separate from the inductive charger station, the inductive power receiver including a transformer secondary selectively mateable with the transformer primary based on movement of the inductive power receiver relative to the inductive charger station and a rectification circuit configured to provide a conditioned DC output power for recharging the electric vehicle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inductive charger station for charging an electric vehicle, the inductive charger station comprising:
    a docking head including a body covered by an electrically insulating coating, the body including one or more tapered protrusions extending out therefrom; and
    a transformer primary that includes one or more transformer cores each having a primary winding wound thereabout, each of the one or more transformer cores positioned within the body and extending into a respective one of the one or more tapered protrusions, the transformer primary configured to provide power to a transformer secondary of an inductive power receiver positioned on an electric vehicle, with a selective engaging and disengaging of the transformer primary and the transformer secondary based on movement of the inducive power receiver on the electric vehicle relative to the inductive charger station;
    wherein the transformer primary comprises a pair of transformer cores each having a primary winding wound thereabout, so as to form a transformer pair, and wherein the transformer pair operates in an interleaved fashion.

2. The inductive charger station of claim 1, further comprising:
    a magnetizing inductor circuit element and a leakage inductor circuit element integrated into the transformer primary.

3. The inductive charger station of claim 1, wherein the docking head comprises:
    a heat sink positioned within the body and mounted to each of the one or more transformer cores on a back side thereof; and
    a heat pipe integrated with the heat sink to provide additional cooling capability to the transformer primary.

4. The inductive charger station of claim 1, wherein the electrically insulating coating that covers the one or more tapered protrusions and the one or more transformer cores and primary winding positioned therein causes a separation between the transformer primary and the transformer secondary so as to create a leakage inductance, and wherein the leakage inductor circuit element integrated into the isolation transformer operates to enable usage of the leakage inductance to establish resonance between the transformer primary and the transformer secondary.

5. The inductive charger station of claim 1, wherein the inductive power receiver comprises a housing defining a cavity configured to receive the docking head therein, the housing including one or more receptacles that receive the one or more tapered protrusions of the docking head therein; and wherein one or more secondary windings of the transformer secondary are positioned about the one or more receptacles such that the primary winding on each of the one or more transformer cores of the transformer primary are positioned in close position to the one or more secondary windings upon positioning of the one or more tapered protrusions within the one or more receptacles.

6. The inductive charger station of claim 5, wherein each of the docking head and the housing of the inductive power receiver include a set of alignment features thereon that collectively form a funnel for motion in a plane parallel to the ground, to align the docking head and the inductive power receiver, the set of alignment features including one or more of flat sections, tapered sections, and radius or funnel surfaces.

7. The inductive charger station of claim 5, wherein the inductive charger station and the inductive power receiver include communications connections thereon operable with one another to provide alignment verification of the docking head with the cavity of inductive power receiver and to provide electric vehicle battery bus voltage and current information, the communications connections comprising one of an optical, infrared, or near-field communications port.

8. The inductive charger station of claim 5, wherein the electrically insulating coating on the one or more protrusions and/or the one or more receptacles comprises an ultra-high molecular weight polyethylene coating and/or wherein the one or more protrusions and/or the one or more receptacles comprises rollers integrated therein, with each of the ultra-high molecular weight polyethylene coating and the rollers reducing friction during alignment and mating of the one or more protrusions with the one or more receptacles.

9. The inductive charger station of claim 1, further comprising:
a base component coupled to the docking head via a post, so as to provide for limited movement of the docking head relative to the base component; and
a pivot member coupled to the base component on an end thereof opposite the docking head, the pivot member configured to rotate the inductive charger station between an upright position that provides for mating of the docking head with the inductive power receiver and a down position that provides for storage of the inductive charger station.

10. The inductive charger station of claim 9, further comprising:
a housing including:
a plurality of bezeled surfaces surrounding an interior cavity, the interior cavity housing the docking head, base component, and pivot member when in the down position; and
a moveable cover positioned over the interior cavity, so as to protect the docking head, base component, and pivot member when in the down position.

11. The inductive charger station of claim 1, further comprising:
an AC-DC power converter coupleable to an AC utility feed circuit breaker panel to receive AC power therefrom and convert the AC power to DC power; and
a DC bus connected to the AC-DC power converter to receive the DC power therefrom;
wherein the inductive charger station is coupled to the DC bus to receive the DC power therefrom.

12. The inductive charger station of claim 11, wherein the AC-DC power converter comprises a 12 kW AC to 400 V DC wall-mounted panel.

* * * * *